United States Patent [19]

Theiler

[11] 4,435,433

[45] Mar. 6, 1984

[54] METHOD FOR INHIBITING NITROSAMINE FORMATION AND ELIMINATING SURFACE CHARRING DURING MEAT COOKING

[75] Inventor: Richard F. Theiler, Scottsdale, Ariz.

[73] Assignee: Armour Food Company, Phoenix, Ariz.

[21] Appl. No.: 389,736

[22] Filed: Jun. 18, 1982

[51] Int. Cl.³ .............................. A23B 4/02; A23B 4/14
[52] U.S. Cl. ..................................... 426/266; 426/332; 426/646; 426/652
[58] Field of Search ............... 426/265, 266, 281, 332, 426/641, 646, 652, 264; 252/400 R, 405, 407; 127/29

[56] References Cited

U.S. PATENT DOCUMENTS

| | | | |
|---|---|---|---|
| 2,781,271 | 2/1957 | Wiesman et al. | 426/652 X |
| 2,902,369 | 9/1959 | Komarik | 426/266 X |
| 3,052,560 | 9/1962 | Delaney | 426/652 X |
| 3,139,347 | 6/1964 | Sair et al. | 426/264 X |
| 3,966,974 | 6/1976 | Bharucha et al. | 426/652 X |
| 4,315,015 | 2/1982 | Theiler | 426/652 X |

OTHER PUBLICATIONS

Pigman, *The Carbohydrates*, 1957, pp. 4, 33 & 36.
Chem. Abstracts, vol. 71, 1969, No. 69468s.
Chem. Abstracts, vol. 91, 1979, No. 54926d.

*Primary Examiner*—Arthur L. Corbin
*Attorney, Agent, or Firm*—Frank T. Barber; Richard G. Harrer; Bernard L. Howard

[57] ABSTRACT

A method for nitrite-curing meat generally, and bacon in particular, wherein the cured product exhibits both a reduced tendency to form nitrosamines and a resistance to surface charring when cooked. The method utilizes the essential step of introducing a reducing sugar alkylated in the C-1 position, a specific example of which is a methylglucoside, into the meat product before cooking for consumption. The alkylated reducing sugar can be introduced either as a constituent of the curing pickle or can be separately delivered into the meat prior to cooking.

23 Claims, No Drawings

METHOD FOR INHIBITING NITROSAMINE FORMATION AND ELIMINATING SURFACE CHARRING DURING MEAT COOKING

DESCRIPTION OF THE INVENTION

1. Field of the Invention

This invention relates to the inhibition of nitrosamine formation during the cooking of nitrite-cured meat products. More specifically, this invention relates to use of a particular compound in a pre-cooking preparation process to thereby both inhibit the production of nitrosamines and avoid a surface charring when the nitrite-cured meat is pan-fried.

2. Description of the Prior Art

In the past, sodium nitrite, and its precursor sodium nitrate, have been widely used as curing agents. The inclusion of a minimum level of sodium nitrite during curing controls the toxin-producing outgrowth of *Clostridium Botulinum* spores in the cured meat. Sodium nitrite also acts to preserve the color of meat products, and is widely believed to improve the flavor of cured-meat products.

Sodium nitrite has been identified as a reactant which, under cooking conditions, sometimes combines with the amines naturally present in meat to ultimately form a number of allegedly carcinogenic nitrosamine compounds. Increased sodium nitrite levels and high cooking temperatures were both found to increase the degree of nitrosamine formation. The problem was particularly acute in the case of bacon, which was typically both nitrite-cured and pan-fried at relatively high temperatures.

In 1978, the U.S. Department of Agriculture placed limits on the allowable levels of nitrosamine present in cooked bacon. The maximum allowable level was fixed in terms of the prevalent nitrosamine generated when cooking bacon, namely N-nitrosopyrrolidine.

A clear need existed for a compound or method which would eliminate or reduce the levels of nitrosamine formed when a nitrited, or nitrite-containing, meat product was cooked. Despite continued reseach, no suitable substitute for nitrite has been identified.

SUMMARY OF THE INVENTION

In accord with a broadest aspect of this invention, it is an object to teach a method for inhibiting the formation of nitrosamines when cooking a nitrited meat product.

It is an object to provide a meat-curing compound that permits the meat to resist both nitrosamine formation and a premature surface charring when subsequently cooked.

It is a further object to teach a method for curing meat in a manner such that the cured-meat product resists nitrosamine formation when cooked.

It is another object to teach a method for treating nitrited meat to inhibit nitrosamine formation when the meat is subsequently cooked.

It is still a further object to teach a method for inhibiting the formation of nitrosamines when cooking nitrited meat, while still avoiding a premature surface charring of the meat.

It is an object to teach a method for curing meat in a manner such that, when subsequently heated to a cooking temperature, the meat both exhibits a low degree of nitrosamine formation and further resists a premature or unacceptable degree of surface charring.

It is yet another object to teach a method for treating nitrited meat in a manner which both inhibits nitrosamine formation and resists surface charring when the meat is subsequently cooked.

it is an object to provide an improved nitrite-cured meat, which resists both nitrosamine formation and a premature surface charring when cooked.

DESCRIPTION OF THE PREFERRED EMBODIMENTS

In accord with one embodiment of this invention, a method for inhibiting the formation of nitrosamine when cooking a nitrite-impregnated meat product is disclosed, comprising the step of introducing a reducing sugar alkylated at the C-1 position into the meat product prior to the step of cooking.

In accord with another embodiment of this invention, an improvement in a method for nitrite-curing uncooked meat is disclosed, comprising the step of permeating the regions of the meat which are to be heated to cooking temperature with a methylglucoside so that the meat product resists nitrosamine formation when subsequently cooked.

In accord with a further embodiment of this invention, a meat curing composition is disclosed, comprising, in combination: a nitrite source; and a reducing sugar alkylated at the C-1 position.

In accord with still another embodiment of this invention, a nitrosamine-formation-resistant nitrite-cured meat product is disclosed, comprising: meat; a nitrite source in the meat; and an alkylated reducing sugar having an alkyl radical bonded at the C-1 position in the meat.

The foregoing and other objects, features and advantages of this invention will be apparent from the following, more particular, description of the preferred embodiments of the invention.

This invention presents a family of nitrosamine-formation resistant meat-curing compounds and a corresponding method for inhibiting the formation of nitrosamines when nitrite-cured meat products are cooked. An additional advantage of the method disclosed herein is an accompanying resistance to surface charring during the cooking process.

According to its broadest concept, the method for inhibiting involves the introduction of an alkylated reducing sugar, namely one alkylated at the C-1 carbon position, into an uncooked meat product. The meat product can be whole, sliced or ground.

The invention can be practiced on nitrite-cured meats, or can be practiced as preface to, or as a part of, the nitrite-curing process. The alkylated reducing sugar can be delivered by itself, or as a constituent of the nitrite-curing pickle. The alkylated reducing sugar can be delivered into whole cuts of meat by injection or by intravenous pumping; into whole cuts, sliced or ground products by diffusion from a pickle bath; into whole cuts, sliced or ground products by diffusion from a direct application onto the surface of the meat; or into ground products by a mechanical mixing.

As broadly conceived, the invention contemplates the use of an alkylated reducing sugar having a good high-temperature stability. Included in this group are alkyl-pyranoses and alkyl-furanoses, either being alkylated with any of a methyl, ethyl or propyl radical.

The demonstrated practice of the invention involves the introduction of a glucose compound, namely alpha- or beta-methylglucoside, into nitrite-cured meat to thereby achieve both good char-resistance and a reduction in the quantity of nitrosamines formed when the meat is subsequently cooked. It has been discovered that permeating portions of the meat, particularly those portions which will be heated to high temperature during cooking, with methylglucoside before cooking results in a substantial reduction in the quantity of nitrosamines present in the cooked product.

A "model bacon system" was developed to provide a consistent testing format to aid in the search for nitrosamine inhibitors. The model bacon system utilized ground pork bellies to reduce the macroscopic and morphological variations otherwise present amont a series of whole sides of bacon. A nitrite-curing solution, commonly known as a "pickle", was added to the ground pork.

For each test, a control pickle and a number of experimental pickle samples were prepared. The control pickle was repesentative of those used to commercially cure bacon. Glucose, or a methylglucoside, was added to each of the experimental pickle samples. A quantity of each respective pickle, equivalent to a 10 percent "pump", was added to a corresponding batch of ground pork. The quantity of pickle added was measured in terms of the "green" weight of the meat. The pickle solution and pork were mechanically mixed.

The pickle-and-pork combination was stuffed into sausage casings to form "chubs". The chubs were smoked and heated to an internal "curing" temperature of 126° F. (52° C.) in accord with conventional curing practice. The chubs were processed in the same manner that bacon is cured, with the resulting products having nominally the same weight as an equal volume of the green meat.

The cured chubs were refrigerated overnight, and subsequently sliced into bacon-slice-thickness pieces. The slices were vacuum packed, and stored under refrigeration for an additional day. The slices were removed from the package, and fried for 5 minutes per side at 170° C. The cooked slices were then comminuted, and examined for the presence of nitrosamines, utilizing the mineral oil vacuum distillation technique as described in D. H. Fine, et al, "A Rapid Method for the Determination of sub-part per Billion Amounts of N-nitroso Compounds in Foodstuffs", *Anal. Chim. Acta.* 78, 383 (1975), and in D. C. Havery, et al, "Survey of Cured Meat Products for Volatile N-Nitrosamines; Comparison of Two Analytical Methods", *J. Assoc. of Anal. Chem.* 61, 1374 (1978). The examinations specifically checked for the presence of N-nitrosopyrrolidine, with results as shown in the following tests.

TEST 1

Reducing sugar was tested as a pickle-additive. A reducing sugar is one known to readily yield an electron when combined with reagents such as Fehling's solution or Tollen's reagent. Glucose is a typical reducing sugar. Four different pickle solutions were prepared, as follows:

|  | Control | 0.3% Glucose | 0.6% Glucose | 1.0% Glucose |
|---|---|---|---|---|
| Water | 81.78 | 78.78 | 75.78 | 71.78 |
| Sodium Chloride | 15.0 | 15.0 | 15.0 | 15.0 |
| Sodium Tripolyphosphate | 2.5 | 2.5 | 2.5 | 2.5 |
| Sodium Erythorbate Monohydrate | 0.6 | 0.6 | 0.6 | 0.6 |
| Sodium Nitrite | 0.12 | 0.12 | 0.12 | 0.12 |
| Glucose | — | 3.0 | 6.0 | 10.0 |

The pickle solutions are respectively identified by the quantity of glucose ultimately introduced into the meat, as a percentage of green-weight. The pickle solutions were respectively added to separate batches of ground pork, which were then prepared in accord with the other steps of the model bacon system curing process. The test results and corresponding surface effects produced by the various batches were as follows:

| Treatment | Glucose Test N—Nitrosopyrrolidine (ppb) | % Reduction | Surface Condition |
|---|---|---|---|
| Control | 13 | — | Normal |
| 0.3% Glucose | 8 | 37.5 | Charred |
| 0.6% Glucose #1 | 7 | | Charred |
| 0.6% Glucose #2 | 6 | | Charred |
| 0.6% Glucose #3 | 6 | | Charred |
| Average | 6.3 | 49.6 | |
| 1.0% Glucose #1 | 3 | | Charred |
| 1.0% Glucose #2 | 3.6 | | Charred |
| Average | 3.3 | 76.6 | |

The addition of glucose provided a substantial reduction in the nitrosamines produced by cooking. Fructose and ribose were also shown to inhibit nitrosopyrrolidine formation. It was separately observed that non-reducing sugars, such as sucrose, did not contribute to a reduction in the extent of nitrosamine formation.

However, when added at concentrations that substantially inhibited the formation of nitrosamines, the reducing-sugar caused a premature darkening or surface-charring as the meat was fried. The surface charring was undesirable. Typical frying-pan temperatures can exceed 170° C.; glucose has been observed to completely heat-deteriorate at about 210° C. A partial deterioration of the glucose within the meat was believed to contribute to the surface charring. A need continued to exist for a nitrosamine-inhibitor which resisted surface charring when the nitrite-cured meat was cooked by frying.

TEST 2

Further research surprisingly revealed that an alkylated reducing sugar, namely a methylglucoside, can be introduced into meat to achieve nitrosamine inhibition without causing an accompanying problem of surface charring. Another group of pickle solutions was prepared as follows:

|  | Control | Glucose | Beta Methylglucose | Alpha Methylglucose |
|---|---|---|---|---|
| Water | 81.78 | 77.78 | 77.78 | 77.78 |
| Sodium Chloride | 15.0 | 15.0 | 15.0 | 15.0 |
| Sodium Tripolyphosphate | 2.5 | 2.5 | 2.5 | 2.5 |

-continued

|  | Control | Glucose | Beta Methylglucose | Alpha Methylglucose |
| --- | --- | --- | --- | --- |
| Sodium Erythorbate Monohydrate | 0.6 | 0.6 | 0.6 | 0.6 |
| Sodium Nitrite | 0.156 | 0.156 | 0.156 | 0.156 |
| Glucose | — | 4.0 | — | — |
| Beta Methylglucose | — | — | 4.0 | — |
| Alpha Methylglucose | — | — | — | 4.0 |

Corresponding chubs were prepared, processed and tested in accord with the standards set for the model bacon system. The following table compares the nitrosamine-inhibition, and accompanying surface effects, offered by both glucose and the methylglucosides.

| Treatment | Methylglucose Test | | |
| --- | --- | --- | --- |
|  | N—Nitrosopyrrolidine (ppb)* | % Reduction | Surface Condition |
| Control | 63.9 ± 6.6 | — | Normal |
| 0.4% Glucose | 34.4 ± 4.6 | 45 | Charred |
| 0.4% β-methylglucose | 37.5 ± 4.3 | 41 | Normal |
| 0.4% α-methylglucose | 39.8 ± 2.9 | 38 | Normal |

*The data is represented as a mean ± a standard deviation for N=5 determinations.

The inclusion of the glucose effected a reduction in nitrosamine formation, but also caused a surface charring. Inclusion of either of the methylglucosides attained approximately a 40% reduction in nitrosamine formation, while still maintaining the normal color and surface condition associated with cooked bacon. The elimination of the surface charring is believed due to the high-temperature stability of methylglucoside. Methylglucose is known to be temperature-stable up to about 275° C.

Since, at the tested level of application, the methylglucoside compounds were shown to be effective as nitrosamine-formation inhibitors to approximately the same extent as glucose, the alkylated-glucose compound will be effective over at least the range of concentration previously demonstrated for glucose. It is known from other sources, such as Theiler U.S. Pat. No. 4,315,015, that including glucose at levels as low as 0.1% of meat weight still results in inhibition of nitrosamine formation. As has been shown in the "glucose test" on page 6, including a glucose level as high as 1.0% of the weight of the meat yields a significant reduction in nitrosamine formation upon cooking of the meat.

While the invention has been particularly described with reference to preferred embodiments thereof, it will be understood by those skilled in the art that the foregoing and other changes in form and detail may be made therein without departing from the spirit and scope of the invention.

I claim:

1. A method for inhibiting the formation of nitrosamines and substantially eliminating surface charring when cooking a nitrite-impregnated meat product, comprising the step of introducing a reducing sugar alkylated at the C-1 position into said meat product prior to said step of cooking.

2. A method in accord with claim 1, wherein said reducing sugar is alkylated with a methyl, ethyl or propyl radical.

3. A method in accord with claim 1, wherein said alkylated-reducing sugar is selected from the group of alkyl-pyranoses and alkyl-furanoses.

4. A method in accord with claim 1 wherein said alkylated reducing sugar is methylglucoside.

5. A method in accord with claim 4, wherein said step of introducing includes the steps of:
combining said methylglucoside with said nitrite-pickle; and
diffusing the combination of said methylglucoside and said pickle into said meat.

6. A method in accord with claim 4, wherein said step of introducing comprises the step of applying said methylglucoside to the surface of said meat.

7. A method in accord with claim 4, wherein said step of introducing includes the steps of:
slicing said meat into slices; and
applying said methylglucoside to the surface of said slices.

8. A method in accord with claim 4, wherein said step of introducing comprises the step of introducing said methylglucoside in a quantity of at least 0.1% of the weight of said meat.

9. A method in accord with claim 4, wherein said step of introducing comprises the step of introducing said methylglucoside in a quantity not exceeding 1.0% of the weight of said meat.

10. A method in accord with claim 4, wherein said methylglucoside is beta-methylglucoside.

11. A method in accord with claim 4 wherein said methylglucoside is alpha-methylglucoside.

12. A method in accord with claim 1, wherein said reducing sugar is glucose.

13. In a method for nitrite-curing uncooked meat, the improvement comprising the step of permeating the regions of said meat which are to be heated to cooking temperature with a methylglucoside so that said meat product resists nitrosamine formation and surface charring when subsequently cooked.

14. A meat curing composition, comprising, in combination:
a nitrite source; and
a reducing sugar alkylated at the C-1 position.

15. A meat curing composition in accord with claim 14 wherein said alkylated reducing sugar comprises a reducing sugar alkylated with an ethyl radical.

16. A meat curing composition in accord with claim 14 wherein said alkylated reducing sugar comprises a reducing sugar alkylated with a methyl radical.

17. A meat curing composition in accord with claim 14 wherein said alkylated reducing sugar comprises a reducing sugar alkylated with a propyl radical.

18. A meat curing composition in accord with claim 14 wherein said reducing sugar comprises a furanose.

19. A meat curing composition in accord with claim 14 wherein said reducing sugar comprises a pyranose.

20. A meat curing composition in accord with claim 14 wherein said reducing sugar comprises glucose.

21. A meat curing composition in accord with claim 14, wherein said alkylated reducing sugar comprises methlyglucoside.

22. A nitrosamine-formation-resistant, nitrite-cured meat product, comprising:
   meat;
   a nitrite source in said meat; and
   an alkylated reducing sugar having an alkyl radical bonded at the C-1 position in said meat.

23. A meat product in accord with claim 22, wherein said alkylated reducing sugar comprises methylglucoside.

* * * * *